Patented Jan. 28, 1947

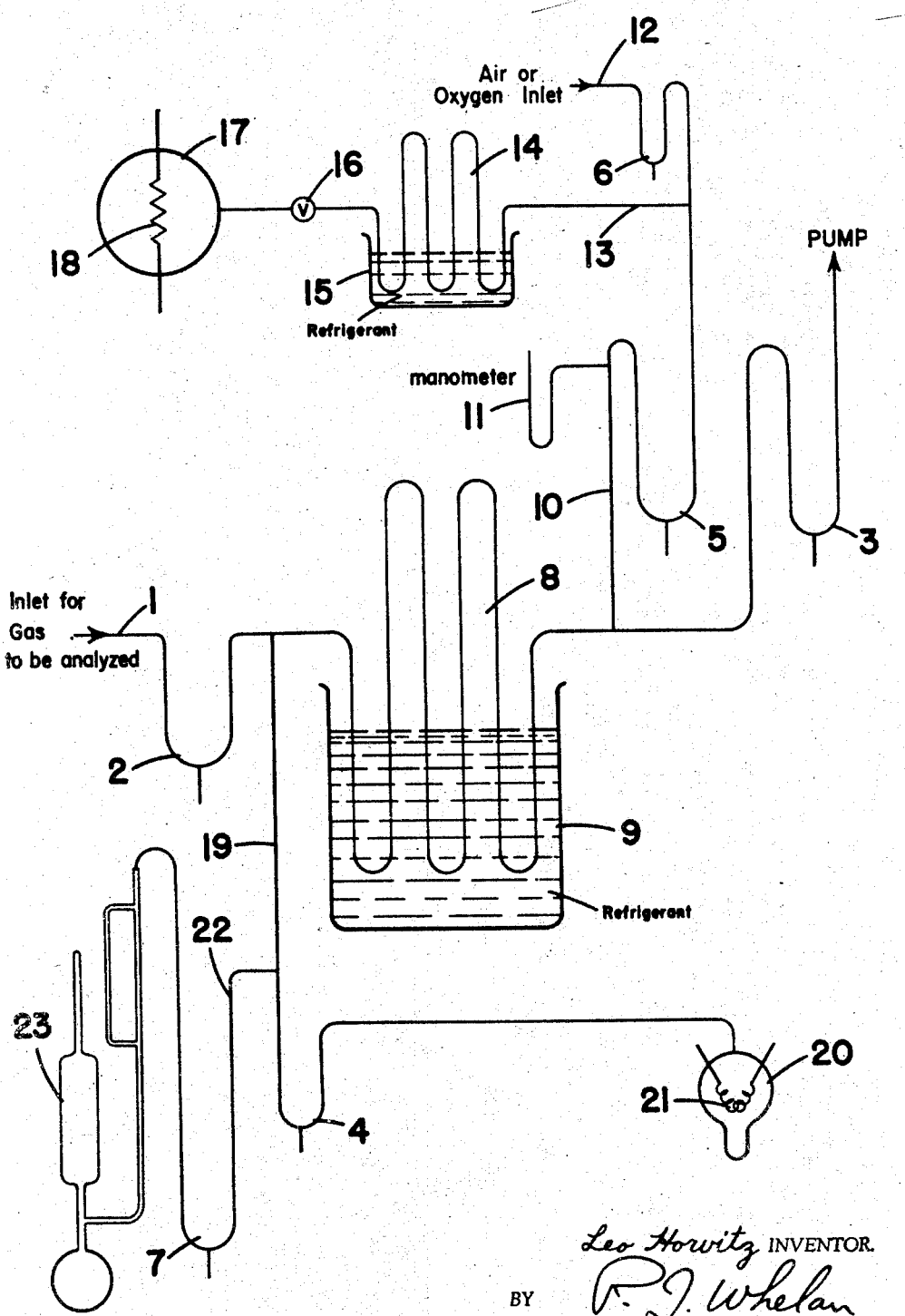

2,414,876

UNITED STATES PATENT OFFICE 2,414,876

GAS ANALYSIS

Leo Horvitz, Houston, Tex., assignor to Esme E. Rosaire, Houston, Tex.

Application March 10, 1941, Serial No. 382,607

5 Claims. (Cl. 23—232)

The present invention relates to gas analysis and has particular application to a geochemical prospecting method in which soil gases are analyzed for minute traces of hydrocarbons, especially those heavier than methane.

An object of the present invention is to provide a unique system for controlling the movement of gas undergoing analysis in the analytical apparatus.

An additional object of the present invention is to effect the movement of gases into combustion tubes and from such tubes to measuring means by subjecting the various parts of the apparatus in sequence to suitable refrigerants.

Further objects and advantages of the present invention will appear from the following detailed description of the accompanying drawing in which the single figure is a front elevation in diagrammatic form of one type of apparatus suitable for carrying out the method of the present invention.

Referring to the drawing in detail, numeral 1 designates an inlet for the gas to be analyzed. In this system there are used mercury float valves which are described in more detail in my co-pending application Serial No. 183,960, filed January 8, 1938, now U. S. Patent No. 2,287,101, and are designated herein by numerals 2, 3, 4, 5, 6, and 7.

The inlet 1 is connected through valve 2 to a trap 8 which is preferably of the type shown in U. S. Patent 2,177,139, issued October 24, 1939. This trap is adapted to be immersed in a suitable refrigerant carried by a vessel 9 which will usually be removably arranged around the trap. The outlet of the trap is connected through valve 3 to a pump. Between valve 3 and the trap is a branch line 10 to which is connected a manometer 11 and which is connected through valves 5 and 6 to an inlet 12 for air or oxygen. Between valves 5 and 6 is a branch line 13, which is connected through a trap 14 similar in construction to trap 8, and similarly capable of being immersed in a refrigerant carried by a vessel 15. The other end of the trap is connected through a valve 16 to a combustion chamber 17 in which is a filament 18 adapted to be heated electrically.

Between valve 2 and trap 8 is a branch line 19 which empties into a chamber 20 which, as will be seen, is of peculiar construction, having, in effect, an inverted pear shape. The stem end of the pear is adapted to be immersed in a refrigerant carried by a receptacle, such as that designated by numeral 9. Arranged in the large end of the chamber 20 is a suitable filament 21 adapted to be heated electrically.

Line 19 is provided with mercury valve 4 between which and the trap 8 is a branch line 22 which is connected through valve 7 to a McLeod gauge 23. The gas to be analyzed is usually prepared for analysis before being introduced into the system in accordance with the teachings of my co-pending applications Serial Nos. 183,960, filed January 8, 1938, now U. S. Patent No. 2,287,101, 369,213, filed December 9, 1940, and 369,124, filed December 9, 1940. Briefly, this preparation involves the removal of carbon dioxide and water from the gas to be analyzed. In the preferred method of geochemical prospecting to which the present invention is particularly directed these gases are obtained by subjecting soil samples, systematically collected over an area to be explored, preferably at a uniform depth in excess of about 4 feet, or from different depths of a well undergoing drilling, to a desorbing action, usually through the agency of heat and vacuum, preferably accompanied by a simultaneous treatment with an inorganic acid, such as hydrochloric acid or phosphoric acid.

Before the gas to be analyzed is introduced into the system, the trap 8, the chamber 20, and the McLeod gauge are all evacuated by application of suction by the pump with valves 3, 4, and 7 open, and the remaining valves closed. After the evacuation, valves 3, 4, and 7 are closed, leaving the various units mentioned in evacuated condition. It is also desirable to prepare a batch of purified air or oxygen to be used in the combustion step. This is accomplished by opening valve 6 while holding valve 5 closed and introducing air or oxygen into branch line 13 and trap 14, and into bulb 17. When a suitable pressure is built up in this system, the valve 6 is closed.

During the admission of this air the trap 14 is partially immersed, as illustrated, in a suitable refrigerant, such as liquid nitrogen. This condenses out, in the trap 14, all the carbon dioxide and water vapor and any heavier hydrocarbons, for example which may be in the air. The valve 16 is then closed and the filament 18 is heated, whereby any combustible impurities in the air or oxygen in the bulb 17 are burned. With valve 16 closed, valve 6 is opened, the refrigerant is removed from the trap, and suction is applied to line 12 whereby any condensibles collected in trap 14 are removed from the system, leaving the space between valve 16 and valves 5 and 6 respectively in evacuated condition. Valve 6 is closed before the suction is disconnected from line 12.

The system then stands with all the valves closed with trap 8, chamber 20, and McLeod gauge in evacuated condition and with a purified sample of air or oxygen in bulb 17. The valve 2 is then opened and the gas to be analyzed is introduced through inlet 1 until the manometer 11 registers about 20 millimeters, while trap 8 is immersed in a suitable refrigerant, such as liquid nitrogen, in receptacle 9. This results in the condensation and collection in trap 8 of constituents such as ethane and heavier hydrocarbons, the methane and air in the gas remaining uncondensed. Valve 2 is then closed, and valve 3 is opened and all uncondensed gas is pumped out of the system.

Valve 3 is then closed and the receptacle 9 is removed from the trap 8, whereupon the condensed constituents vaporize and become gaseous. If desired, valve 7 can then be opened and the volume of these constituents measured by the McLeod gauge. This measurement serves a useful purpose, in connection with subsequent measurements in ascertaining the hydrocarbon components of the gas. If this volume is measured at this point the receptacle 9 is again applied to trap 8 in order to cause the condensibles to flow from the McLeod gauge to the trap, where they are again collected. Of course, if the volume-measuring step is not employed, this repeated trapping is not necessary. After the volume is measured and the condensibles are again collected in trap 8, valve 7 is closed and valve 4 is opened and the receptacle 9 is again removed from trap 8. The same receptacle 9 or a similar receptacle containing a suitable refrigerant, such as liquid nitrogen, is then applied to the small end of the chamber 20. The removal of the receptacle from the trap 8 causes the condensed constituents to vaporize and the application of the refrigerant to the bottom of chamber 20 causes these vapors or gases to flow into chamber 20, where the condensibles are again condensed.

At this point refrigerant is again applied to trap 14 and valves 5 and 16 are opened, whereby the gas from bulb 17 is permitted to pass into the chamber 20. In its passage through refrigerated trap 14, any products of combustion contained in this gas are condensed and removed. The amount of air or oxygen admitted is indicated on the manometer 11 and this will usually be an amount sufficient to raise the pressure in the system to about 25 millimeters. When this pressure is attained, valve 4 is closed, the refrigerant is removed from the lower end of chamber 20, and the filament 21 is heated, whereby the vaporized constituents in chamber 20 are burned.

After the burning is completed, which will usually take place in from 1 to 3 minutes, the valve 4 is opened, valve 5, in the meantime having been closed when the desired pressure was attained in the system. The refrigerant is again applied to trap 8, causing the gases containing the products of combustion to move in this direction, with the result that the products of combustion, namely, carbon dioxide and water, are condensed and collected in trap 8. This operation will ordinarily take not more than a minute and, at its conclusion, the valve 3 is opened and suction is applied to the system to withdraw all non-condensed gases from the trap 8, the line 19, and the chamber 20.

At the end of the pumping step, which will ordinarily be complete in about 3 or 4 minutes depending upon the type of pump used, the valves 3 and 4 are closed, the refrigerant is removed from trap 8, and valve 7 is opened, permitting the vaporized constituents to move from trap 8 to the McLeod gauge. It will be understood that the volume of the system, including the McLeod gauge, the line 22, the line 19, the trap, and the lines between the trap and valve 3 and valve 5 is known. With this volume fixed, the reading of the McLeod gauge may be taken as a measure of the carbon dioxide and water produced by the combustion in chamber 20. If desired, the liquid nitrogen around the trap 8 can be replaced by a refrigerant which will maintain a temperature such that only carbon dioxide will vaporize out of the trap. In this connection, it may be noted that the system at this point is at an extremely low pressure, usually only a fraction of a millimeter whereby, in the absence of a refrigerant, water will also vaporize. A Dry Ice acetone bath is a suitable refrigerant which will permit the vaporization of carbon dioxide while holding the water in a condensed state. When this operation is adopted, the reading on the McLeod gauge indicates only the quantity of carbon dioxide produced by the combustion. Then, of course, by removing the second refrigerant from the trap and making another reading of the McLeod gauge, the amount of water produced can be determined by difference.

Referring these readings to those taken before burning enables the operator to determine the carbon-hydrogen ratio, thereby giving information as to the nature of the hydrocarbons. This, together with the choice of suitable temperatures of previous fractionation of the gas can be made to give information as specific as desired.

It will be observed that in this system the movement of the gas undergoing analysis from one portion of the apparatus to another is effected by making a cold spot out of the point to which it is desired to move the gas. This simplifies the system considerably and makes for a rapid, accurate operation. The constituents to be determined are present in the gases ordinarily analyzed in this apparatus in amounts ranging from a few parts per million to perhaps several hundred parts per million. The accuracy and sensitivity of this apparatus may be best characterized by the statement that it will measure down to one part of the significant constituents per million parts of gas.

It will be understood that the apparatus shown and the various values given the specific description are purely illustrative. For example, when constituents heavier than ethane are sought different refrigerants will be employed. The operating times for the various steps may vary with different gases, different refrigerants, different vacuum pumps, and different sizes of apparatus. All these details are given here merely to describe a complete operation.

The nature and objects of the present invention having been thus described and illustrated, what is claimed as new and useful and is desired to be secured by Letters Patent is:

1. In the method of gas analysis in which combustible constituents are burned and the products of combustion measured, the steps which comprise admitting the gas to be analyzed into a closed system containing a cold spot of a temperature sufficiently low to effect the condensation of the constituents to be determined and thereafter moving said constituents to different parts of the apparatus by successively moving said cold spot to said different parts of the apparatus.

2. A method for analyzing a gas for its content of combustible material present therein in minute amounts which comprises introducing said gas into a closed system including a condensation zone and a combustion zone, refrigerating said condensating zone to a temperature sufficiently low to effect the condensation of the combustible constituents, withdrawing the residual gas from the system, withdrawing the refrigerant from the condensation zone and applying a refrigerant to the combustion zone whereby the condensed constituents are caused to vaporize and travel to the combustion zone, thereafter withdrawing the refrigerant from the combustion zone, burning the combustible constituents and measuring the products of combustion.

3. A method for analyzing a gas for its content of combustible constituents present therein in minute amounts which comprises introducing the gas into a closed system including a condensation zone and a combustion zone, applying refrigeration to the condensation zone to effect the condensation therein of the combustible constituents of said gas, withdrawing the residual gas from the system, withdrawing the refrigerant from the condensation zone and applying a refrigerant to the combustion zone whereby said condensed constituents are caused to vaporize out of said condensation zone and travel to said combustion zone where they are again condensed, withdrawing the refrigerant from the combustion zone, burning the combustible constituents, again applying a refrigerant to the condensation zone whereby the products of combustion are caused to travel to said condensation zone and condensed therein, withdrawing the residual gas from the system, and measuring the quantity of the products of combustion.

4. A method according to claim 3 in which the closed system is evacuated before the introduction therein of the gas to be analyzed.

5. A method for analyzing a gas for combustible constituents present therein in minute amounts which comprises introducing the gas into a closed evacuated system including a condensation zone and a combustion zone, applying a refrigerant to the condensation zone to effect the condensation therein of the combustible constituents contained in said gas, removing the residual gas from the system, withdrawing the refrigerant from the condensation zone whereby the condensed constituents are vaporized, measuring the resulting pressure in the system as a measure of the quantity of said condensed constituents, applying a refrigerant to the combustion zone, thereby causing said constituents to condense in said zone, introducing a combustion supporting gas into said zone, withdrawing the refrigerant from said combustion zone whereby the said condensed constituents are vaporized, burning said constituents, applying a refrigerant to the condensation zone whereby the products of combustion are caused to condense therein, removing the residual gas from the system, and determining the quantity of the condensed combustion products.

LEO HORVITZ.